Nov. 24, 1936.  M. P. DE MOTTE  2,061,898

MOTOR

Filed Jan. 17, 1933  3 Sheets-Sheet 1

INVENTOR
MAURICE P. DE MOTTE
BY
ATTORNEY

Nov. 24, 1936.  M. P. DE MOTTE  2,061,898
MOTOR
Filed Jan. 17, 1933  3 Sheets-Sheet 2
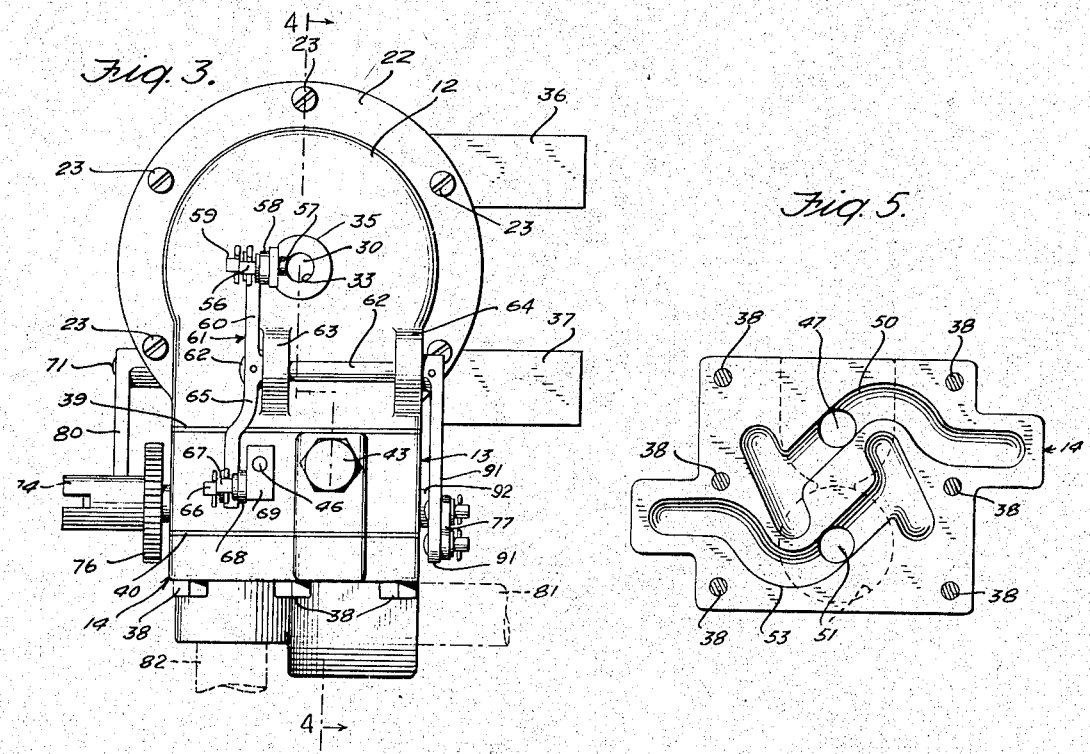
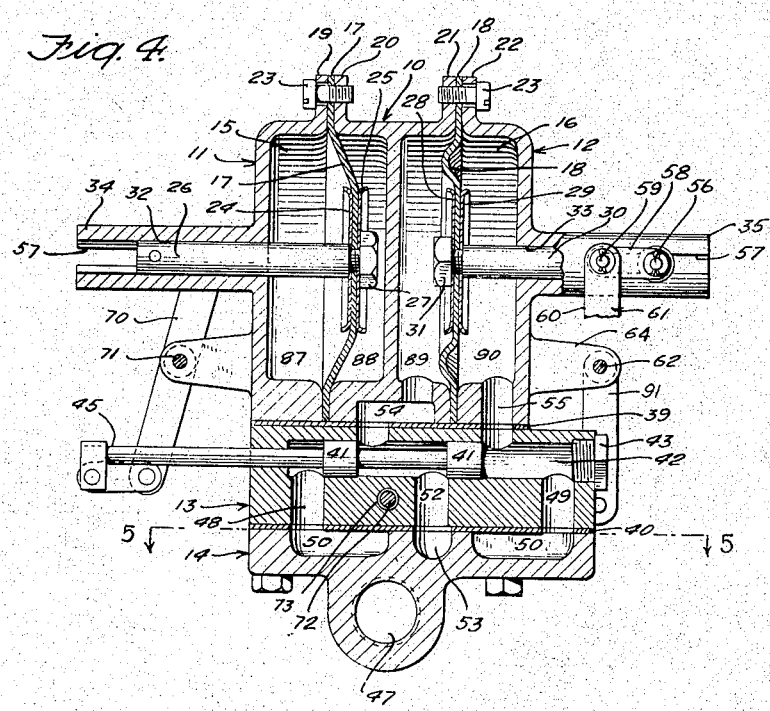
INVENTOR
MAURICE P. DE MOTTE
BY
ATTORNEY

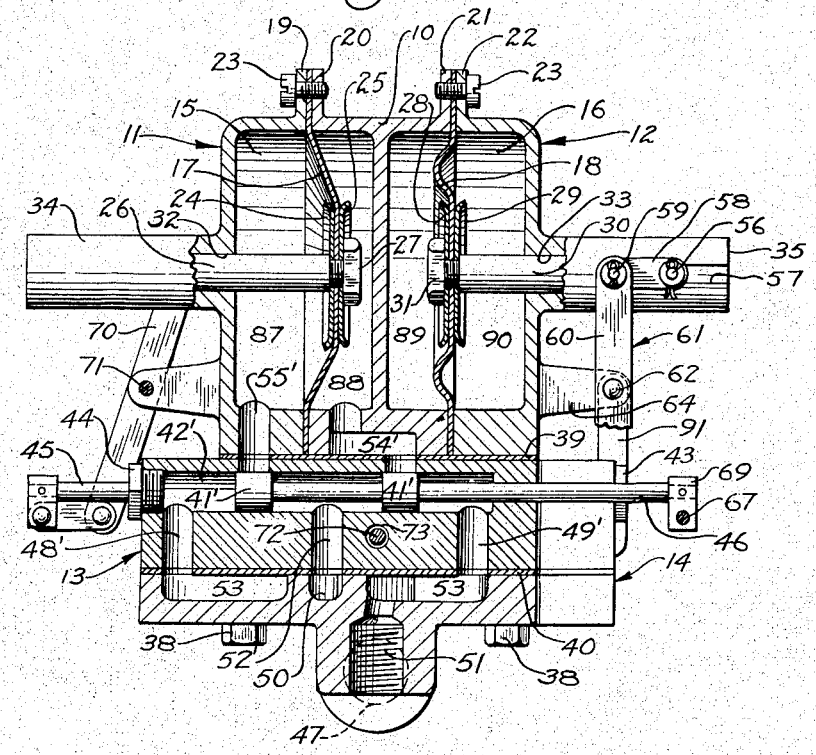

Patented Nov. 24, 1936

2,061,898

UNITED STATES PATENT OFFICE 2,061,898

MOTOR

Maurice P. De Motte, Indianapolis, Ind., assignor, by mesne assignments, to Union Carbide and Carbon Corporation, a corporation of New York Application January 17, 1933, Serial No. 652,139

18 Claims. (Cl. 121—48)

The invention pertains to fluid motors such as those used to operate carbide feeding or agitating devices in acetylene generators, and more specifically to the novel structure and distinctive features of such a motor shown in my copending application, Serial No. 644,058.

The chief objects of this invention are to provide such a motor that is comparatively small and compact so that it may be located in the limited space in an acetylene generator, a motor in which condensed moisture will not collect and interfere with its free operation, a motor that is comparatively free from friction so it will operate on a small difference in pressure between the inlet and outlet, a motor that has no dead center so it will start with the flow of operating gas or fluid, a motor that offers a continuous and uniform resistance to the flow of gas therethrough so that it causes no objectionable fluctuations or variations in gas pressure at the outlet, a motor that operates at a speed proportional to the volume of gas flowing therethrough, a motor having simple and efficient means for converting reciprocating motion into rotary motion, and a motor that is comparatively simple, rugged, durable and efficient.

These and any other objects and novel features will be apparent from the following specification and the accompanying illustrations, in which:

Fig. 3 is an end view;

Fig. 4 is a sectional view along line 4—4 of Fig. 3;

Fig. 5 is a detail view taken along line 5—5 of Fig. 4 showing the top of the collector plate; and Fig. 6 is a view partially in section along line 6—6 of Fig. 3, the ends of the cylinder casings with attached operating mechanism not being in section.

Figure 1:
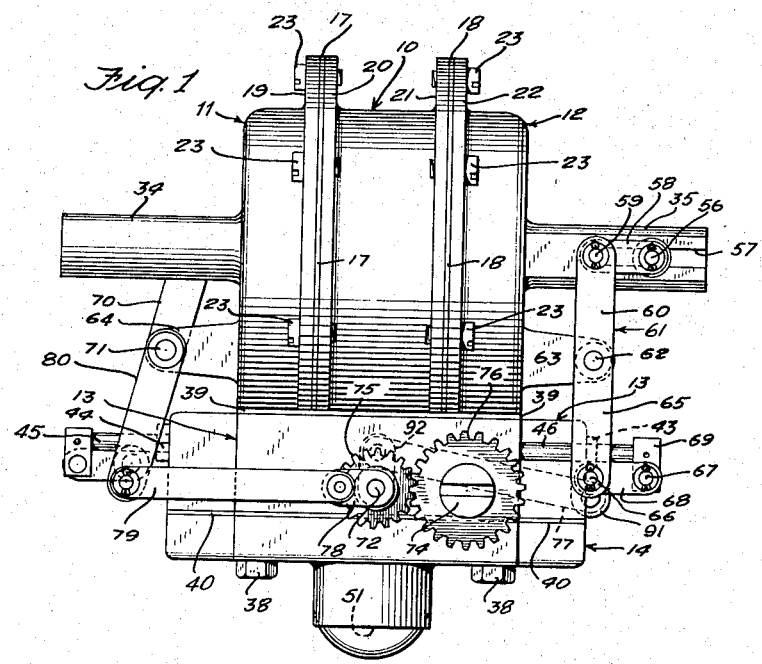
Fig. 1 is a side view of a motor embodying my invention.
Figure 2:
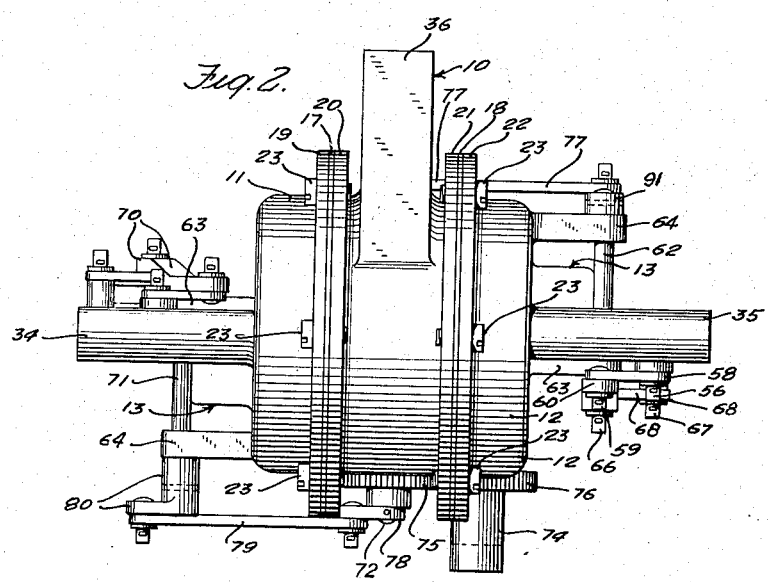
Fig. 2 is a top view of the same.

The motor has a casing of suitable material such as casting of iron, aluminum or brass comprising a central cylinder portion 10, symmetrical end cylinder portions 11 and 12, a valve block 13 below the cylinders, and a collector plate or manifold 14 below the valve block. The three portions of the tandem cylinders are in axial alignment and each of the end portions 11 and 12 and the central portion 10 are provided with cooperating openings that form adjoining tandem piston chambers 15 and 16 with a common imperforate wall therebetween. In order to reduce friction the piston chambers 15 and 16 are provided with frictionless diaphragm pistons 17 and 18 having their outer margins respectively clamped between flanges 19 and 20 at the junction of cylinder portions 10 and 11, and flanges 21 and 22 at the junction of cylinder portions 10 and 12, by suitable means such as bolts or screws 23. The central portion of diaphragm 17 is clamped between supporting disks 24 and 25 rigidly secured to piston rod 26 by nut 27, and the central portion of diaphragm 18 is clamped between similar supporting disks 28 and 29 rigidly secured to piston rod 30 by nut 31. Piston rods 26 and 30 are respectively guided or supported in openings 32 and 33 in bosses 34 and 35 projecting outward respectively from the opposite faces of cylinder portions 11 and 12, and the central cylinder section 10 is provided with mounting bosses 36 and 37 having openings suitably threaded for the mounting screws or bolts employed.

The valve block 13 and manifold 14 are secured to the under side of cylinder portions 10, 11 and 12, by suitable means such as bolts or cap screws 38, and the joints between the cylinder portions, valve block and manifold are provided with gaskets 39 and 40, respectively. The valve block 13 is provided with suitable valves such as parallel piston valves, of which one is shown at 41, that operate in horizontal valve chambers such as that shown at 42. Opposite ends of the parallel valve chambers are closed by plugs 43 and 44 respectively, and stems 45 and 46 of the valves extend outward respectively through suitable openings in the valve block from the ends of the valve chambers opposite those closed by plugs 43 and 44. As the motor is adapted for use in the gas chamber of an acetylene generator where slight gas leakage is not detrimental, the valve stems and piston rods are not provided with stuffing boxes or other packing.

The adjacent piston chambers 15 and 16 are divided vertically at approximately the center by the pliable diaphragms 17 and 18 respectively into pressure chambers 87, 88, 89, and 90, and suitable ports or passages are provided in the cylinder portions, valve block, and manifold, to conduct the operating gas or other fluid from the motor inlet to these pressure chambers and back to the motor outlet. These passages lead in a generally downward direction from the pressure chambers to the inlet and outlet so that any moisture that may condense or collect in the chambers and passages from the moisture laden gas will drain to the inlet or outlet and not interfere with the operation of the motor.

The ends of valve chamber 42 are connected with motor outlet 47 by outlet ports 48 and 49 in valve block 13 and passage 50 in manifold 14, and the central portion of valve chamber 42 is connected with motor inlet 51 by port 52 in valve block 13 and passage 53 in manifold 14. Pressure chamber 89 is connected with valve chamber 42 between ports 48 and 52 by port 54, and pressure chamber 90 is connected with valve chamber 42 between ports 49 and 52 by port 55. Pressure chambers 87 and 88 are connected with their associated valve chamber 42' by ports 54' and 55', and this valve chamber is connected with inlet 51 and outlet 47 by ports 48', 49', and 52', of which port 52' is an outlet port opening into passage 50, and ports 48' and 49' are inlet ports opening into passage 53. The valves such as those shown at 41 and 41' operate in a conventional manner except that no period of cut-off and expansion is provided.

Each of the valves, such as 41, that controls the flow of operating gas to one of the piston chambers 15 and 16 is operated by the movement of the piston or diaphragm in the other piston chamber. For example, piston rod 30 is provided with a guide or pin 56 that moves in a guide slot 57 in boss 35 and is connected by means of a link 58 with a pin 59 secured to the upper arm 60 of a lever 61 rigidly secured to a rocker shaft 62 which oscillates in bearing supports 63 and 64 on cylinder section 12. The lower arm 65 of lever 61 is connected with valve stem 46 in a similar manner by pins 66 and 67, link 68, and yoke 69. Piston rod 26 is connected with valve stem 45 in a similar manner by corresponding means comprising a lever 70 and a rocker shaft 71.

My improved fluid motor is also provided with means for converting the reciprocating motion of the pistons into rotary motion, and means for transmitting this rotary motion to a device operated by the motor. The piston movement is transmitted by the converting means to a crankshaft 72 carried or journaled in a transverse horizontal opening 73 in valve block 13 below the cylinders. Although the driving power of the motor may be taken directly from shaft 72, I prefer to provide the motor with a portion 74 of a separable coupling suitably journaled on a portion of the motor such, for example, as the valve block 13, and suitable means for driving the coupling by the crankshaft such as enmeshed speed reducing gears 75 and 76 rigidly secured to shaft 72 and coupling 74 respectively.

The motion converting means or driving connections between pistons 17 and 18 and crankshaft 72 comprises the horizontal piston rods 26 and 30, and the connecting elements between the piston rods and rocker shafts 62 and 71 already described. This means also comprises an arm 91 rigidly secured to rocker shaft 62, a crank 92 rigidly secured to one end of crankshaft 72, and a link 77 having one end suitably journaled to the movable end of arm 91, and one end similarly journaled to the movable end of crank 92. The other end of shaft 72 is provided with a similar crank 78 located at 90° from crank 92 and suitable corresponding means for connecting this crank with rocker shaft 71 comprising a link 79 and an arm 80 rigidly secured to shaft 71.

The pistons in my improved motor are double acting, and the relative position of one piston is separated from the other by a quarter of a cycle. Therefore, as the valve controlling the flow of gas to and from each piston chamber is operated by the movement of the piston in the other chamber, and as no period of cut-off and expansion is provided, at least one piston chamber is always in communication with both the inlet and outlet. Consequently, the motor is self starting. Also, due to the relative position of the pistons and valves in their cycle of movement, the open periods of the inlet and exhaust ports of the piston chambers overlap and therefore the motor offers a continuous and uniform resistance to the flow of operating gas that causes no undesirable fluctuations or variation in the gas pressure at the outlet and consequently no objectionable fluctuations in the flame of devices using the gas.

When in use the motor is preferably mounted within the gas chamber or compartment of an acetylene generator. The outlet 47 of the motor is provided with a suitable conduit 81 that passes through the outer wall of the gas chamber and forms the outlet for the generator, and coupling 74 is connected by suitable means with the carbide feeding or agitating mechanism of the generator. The inlet 51 of the motor may be left open or it may be provided with a conduit 82 leading to a more desirable portion of the generator, or a suitable filter for removing dust from the operating gas.

During operation gas enters the inlet 51 and flows upward through the connecting ports in valve block 13 to the valve chambers where the valves distribute it to first one side and then the other of the pistons 17 and 18 in piston chambers 15 and 16. The gas flowing into the piston chambers moves the pistons and this movement forces the gas from the other side of the pistons down through the valve chambers and ports in the valve block to the outlet.

While the motor is especially designed to operate in an acetylene generator it may be employed in other places and the piston rods and valve stems may be provided with conventional stuffing boxes or other packing to prevent or reduce leakage of operating fluid or gas.

So long as the function is retained the form, shape, and relative position of the component parts may be changed, and also various similar or equivalent materials may be employed in place of those specified without departing from the range of the invention or the scope of the claims.

I claim:—

1. A fluid motor comprising a casing having adjoining piston chambers; valve chambers below said piston chambers; an inlet and an outlet below said valve chambers; ports leading in a downward direction between the bottom of said piston chambers and said valve chambers; and ports leading in a downward direction between the bottom of said valve chambers and said inlet and said outlet so that all accumulations of condensed liquid will drain from said motor through both said inlet and said outlet.

2. A fluid motor having a casing comprising three cylinder portions secured together in alignment and provided with two piston chambers each formed by cooperating recesses in two of said portions; a valve block secured to said portions and provided with parallel valve chambers; a manifold secured to said valve block; and connecting ports between said inlet, outlet, and chambers.

3. A fluid motor comprising a casing provided with tandem piston chambers with a common imperforate wall therebetween; a valve chamber associated with each of said piston chambers; an inlet and an outlet; connecting ports leading in a downward direction from the bottom of said piston chambers to said valve chambers; and connecting ports leading in a downward direction from the bottom of said valve chambers to said inlet and said outlet, so that all accumulations of liquid will drain from said motor through said inlet and outlet.

4. A fluid motor comprising a casing provided with tandem piston chambers in alignment and a valve chamber associated with each piston chamber; respective pistons in said piston chambers having piston rods extending outward from opposite ends thereof; a valve in each of said valve chambers having a valve stem extending outward adjacent and parallel to the piston rod of the piston in the piston chamber associated with the other valve chamber; and means for operatively connecting each of said piston rods with the valve stem adjacent thereto.

5. A fluid motor comprising a casing provided with tandem piston chambers and associated parallel valve chambers; a piston in each of said piston chambers; a valve in each of said valve chambers for controlling the flow of fluid to one of said piston chambers; a crankshaft; and means for operatively connecting the piston in each of said piston chambers with the valve controlling the flow of fluid to the other piston chamber, and also to said crankshaft.

6. A fluid motor comprising a casing provided with horizontal tandem pistons in axial alignment; horizontal parallel piston valves below said pistons and parallel thereto; a horizontal transverse crankshaft below said valves; and means for operating said valves and crankshaft by said pistons.

7. A fluid motor comprising a casing provided with tandem piston chambers in axial alignment with a common wall therebetween, and valve chambers associated with said piston chambers; respective pistons in said piston chambers having respective piston rods extending outward from opposite respective ends of said motor; respective valves in said valve chambers having valve stems extending outward from opposite respective ends of said motor; a crankshaft; and means for operating said crankshaft and valves by movement of said pistons.

8. A fluid motor comprising a casing of three cylinder portions provided with integral ends secured together in horizontal alignment and having tandem piston chambers therein; a valve block having parallel valve chambers therein secured to the under side of said cylinder portions; and a manifold having an inlet and an outlet in the under side thereof secured to the under side of said valve block.

9. A fluid motor comprising a casing having piston chambers, a valve block having valve chambers, and a manifold; said casing, block and manifold being provided with passages and ports including an inlet and an outlet; said valve block being disposed below the casing and said manifold being disposed below said valve block; the bottoms of said passages and ports extending downwardly whereby no depressions are formed which could collect liquids.

10. A fluid motor, adapted for operation by movement of a moisture laden gas at relatively low pressure and substantially atmospheric temperature from which moisture may condense within said motor and interfere with the operation thereof if allowed to collect, comprising, a plurality of horizontal piston chambers; a plurality of horizontal valve chambers below said piston chambers; an inlet and an outlet below said valve chambers; suitable connecting ports leading in a downward direction between the lowermost portion of said piston chambers and the uppermost portion of said valve chambers; and suitable ports leading in a downward direction between the lowermost portions of said valve chambers and said inlet and outlet so that all accumulations of condensed liquid within the chambers and passages of said motor will drain from said inlet and outlet and not interfere with the flow of gas through the motor.

11. A compact fluid motor, adapted for operation within an acetylene generator, comprising a casing composed of three cylinder portions secured together in axial alignment and provided with two piston chambers each formed by cooperating recesses in two of said portions, of which each portion is provided with an integral end wall for at least one of said piston chambers; a valve block operably secured to the bottom of said cylinder portions and having a horizontal area substantially the same as that of said cylinder portions; an integral inlet and outlet manifold operably secured to the bottom of said valve block and having a horizontal area substantially identical with that of said valve block and suitable connecting ports between said manifold and said piston chambers.

12. A compact low friction fluid motor, adapted for operation within an acetylene generator, comprising a casing provided with tandem piston chambers; a diaphragm piston in each of said piston chambers; a boss, extending outwardly from each end of said casing along the axis of said piston chambers, provided with an opening extending therethrough into one of said piston chambers, and with a guide slot through the wall thereof surrounding said opening; a piston rod secured to each of said pistons and extending outward through the opening in one of said bosses; a guide disposed in each of said guide slots and rigidly secured to one of said piston rods; a horizontal crankshaft journaled in said casing transverse to the axis of said piston chambers; a crank on each end of said crankshaft; and independent means for connecting each of said guides with one of said cranks.

13. A compact self-contained fluid motor, adapted for operation within an acetylene generator, comprising a casing provided with tandem piston chambers in axial alignment and a plurality of valve chambers parallel with the axis of said piston chambers with which they are associated respectively; a diaphragm piston in each of said piston chambers; piston rods respectively connected with said pistons and extending outward respectively from opposite ends of said casing; a valve in each of said valve chambers provided with a valve stem extending outwardly adjacent and parallel to the piston rod with which the other valve is associated; a crankshaft journaled in said casing transverse to the axis of said piston chambers; and independent means at each end of said motor for operatively connecting one of said piston rods with the valve stem adjacent thereto and with one end of said crankshaft.

14. A compact motor, adapted for operation within an acetylene generator, comprising a casing; independent piston rods and valve stems with one of each extending outward from opposite ends of said casing; a crankshaft journaled in said casing; and means for operatively connecting each end of said crankshaft with the piston rod and valve stem at one end of said motor, comprising, a rocker shaft journaled in suitable supports rigidly secured to the end of said casing, a lever rigidly secured to said rocker shaft and provided with an arm operatively connected with said piston rod and an arm operatively connected with said valve stem, and an arm having one end rigidly secured to said rocker shaft and the other end operatively connected with one end of said crankshaft.

15. A compact fluid motor, adapted for operation within an acetylene generator, comprising a casing provided with tandem piston chambers and a valve chamber associated with each piston chamber; a piston rod extending outwardly from each end of said motor; a valve stem extending outwardly from each end of said motor parallel with said piston rods; a transverse crankshaft journaled in and extending through said casing; a crank secured to each end of said crankshaft adjacent said casing; and independent means for operatively connecting each of said cranks with the piston rod and valve stem at one end of said motor.

16. A compact low resistance fluid motor, adapted for operation within an acetylene generator, comprising a casing composed of three cylinder portions secured together in axial alignment and provided with two piston chambers each formed by cooperating recesses in two of said portions; a diaphragm piston in each of said piston chambers having the outer margin thereof secured in the joint between two of said cylinder portions; a valve chamber associated with each of said piston chambers; a valve in each of said valve chambers; a crankshaft journaled in said casing; means for connecting each end of said crankshaft with one of said pistons so that the movement of said pistons is separated by a quarter of a cycle; an inlet and an outlet of said motor and suitable passages including said valve chambers for connecting said inlet and outlet with each of said piston chambers; and means for connecting each of said valves with one of said pistons so that the inlet and outlet passages between said inlet and outlet and one of said piston chambers is always open.

17. A compact fluid motor, adapted for operation within an acetylene generator, comprising a casing provided with tandem piston chambers; a valve chamber associated with each piston chamber; pistons in said piston chambers provided with piston rods extending outwardly from opposite ends of said motor; spaced piston valves in said valve chambers having valve stems each extending outwardly from one end of said motor adjacent the piston rod associated with the other valve; means for operatively connecting the piston rod and valve stem at each end of said motor so that the valve stem moves in a direction opposite that of the piston rod; suitable ports between each of said piston chambers and its associated valve chamber; and means for conducting an operating fluid through said motor, comprising two inlet ports and one outlet port for one of said valve chambers and two outlet ports and one inlet port for the other of said valve chambers.

18. A compact self-contained fluid motor, adapted for operation within an acetylene generator, comprising a casing composed of three cylinder portions operably connected and provided with two piston chambers therein; piston rods extending outward respectively from opposite ends of said cylinder portions; a unitary valve block operably secured to the lower side of said cylinder portions and having suitable valve chambers therein; valves in said valve blocks having stems extending outward respectively from opposite ends of said valve block; a combination unitary inlet and outlet manifold secured to the underside of said valve block; a crankshaft journaled in said valve block; and means for operatively connecting the respective ends of said crankshaft with the piston rods and valve stems at the opposite ends of said casing.

MAURICE P. DE MOTTE.